US012544288B1

(12) United States Patent
Whitehouse

(10) Patent No.: US 12,544,288 B1
(45) Date of Patent: Feb. 10, 2026

(54) AIRTIGHT SEAL FOR PRESSURIZED HYPERBARIC CHAMBER

(71) Applicant: Typhoon Water Wares LLC, Pocomoke, MD (US)

(72) Inventor: Andrew L. Whitehouse, Pocomoke, MD (US)

(73) Assignee: Typhoon Water Wares LLC, Pocomoke, MD (US)

( * ) Notice: Subject to any disclaimer, the term of this patent is extended or adjusted under 35 U.S.C. 154(b) by 0 days.

(21) Appl. No.: 19/051,883

(22) Filed: Feb. 12, 2025

Related U.S. Application Data

(60) Provisional application No. 63/728,514, filed on Dec. 5, 2024.

(51) Int. Cl.
*A61G 10/02* (2006.01)

(52) U.S. Cl.
CPC .................................. *A61G 10/023* (2013.01)

(58) Field of Classification Search
CPC ................................................ A61G 10/00–04
USPC .......................... 128/202.12, 205.26; 600/21
See application file for complete search history.

(56) References Cited

U.S. PATENT DOCUMENTS

| | | | | |
|---|---|---|---|---|
| 5,316,541 A * | 5/1994 | Fischer | A61G 10/005 | 128/853 |
| 5,678,543 A * | 10/1997 | Bower | A62B 31/00 | 128/205.26 |
| 11,052,007 B2 | 7/2021 | McKeeman | | |
| 12,156,835 B1 | 12/2024 | Whitehouse | | |
| 2008/0210239 A1 * | 9/2008 | Lewis | A62B 31/00 | 128/205.26 |

FOREIGN PATENT DOCUMENTS

| | | | |
|---|---|---|---|
| WO | WO-2023012794 A1 * | 2/2023 | A61G 10/026 |

* cited by examiner

*Primary Examiner* — Elliot S Ruddie
(74) *Attorney, Agent, or Firm* — BLANK ROME LLP

(57) ABSTRACT

An inflatable chamber has a chamber wall, sealing panel, and seal flap. A chamber zipper is formed in the chamber wall, and a panel zipper is formed in the panel. The panel has a panel perimeter that is sealed to said chamber wall about the chamber zipper in an airtight manner to form a pocket between the chamber wall and the panel. The seal flap is positioned in the pocket to provide an airtight seal at the chamber zipper.

19 Claims, 7 Drawing Sheets

AIRTIGHT SEAL FOR PRESSURIZED HYPERBARIC CHAMBER

RELATED APPLICATION

This application claims the benefit of priority of U.S. Provisional Application No. 63/728,514, filed on Dec. 5, 2024, the entire content of which is relied upon and incorporated herein by reference in its entirety.

BACKGROUND

Field

The present invention relates to hyperbaric chambers and for an airtight seal for a pressurized hyperbaric chamber.

Background of the Related Art

Hyperbaric chambers are pressurized vessels designed to enclose a person or object. Portable hyperbaric chambers are typically made of a cloth or plastic material and have an entry that allow a user to enter the chamber. A zipper seals the entry. Once the zipper is closed, the chamber can be inflated and pressurized to treat the person or object inside. One such example of a pressurized hyperbaric chamber is shown in U.S. Pat. No. 11,052,007 to McKeeman, and U.S. Pat. No. 12,156,835, which are hereby incorporated by reference. However, the zipper is not always completely airtight, may have small air leaks, and the zippers can wear due to use and degrade the airtight effectiveness over time.

SUMMARY

It is one object of the present disclosure to provide an airtight seal. It is another object to provide an airtight seal that can be used for a portable pressurized hyperbaric chamber. It is a further object to provide an airtight seal that is easy to use at a door opening and is easy to use without interfering with the ingress and egress through the door opening. It is a further object of the disclosure to provide a portable pressurized hyperbaric chamber having a door opening with a closure member with an airtight seal. These and other objects of the invention, as well as many of the intended advantages thereof, will become more readily apparent when reference is made to the following description, taken in conjunction with the accompanying drawings.

BRIEF DESCRIPTION OF THE FIGURES

FIG. 6(*b*) is a side view of the seal assembly of FIG. 6(*a*) when the chamber is pressurized;

FIG. 6(*c*) is an enlarged view of a section of FIGS. 6(*a*), (*b*);

FIG. 7(*b*) is a side view of the seal assembly of FIG. 7(*a*) when the chamber is pressurized; and FIG. 7(*c*) is an enlarged view of a section of FIGS. 7(*a*), (*b*).

DETAILED DESCRIPTION

Figure 1:
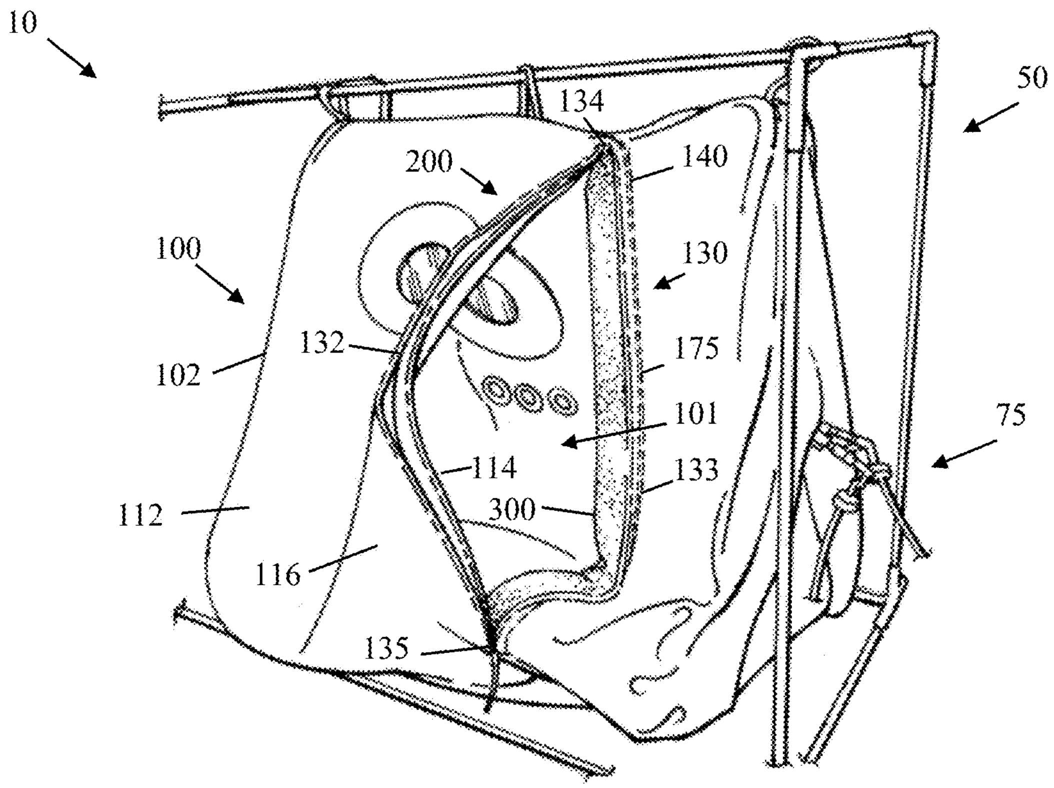
FIG. 1 is a perspective front view of an unpressurized hyperbaric chamber having a closure member with an airtight seal.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 2:
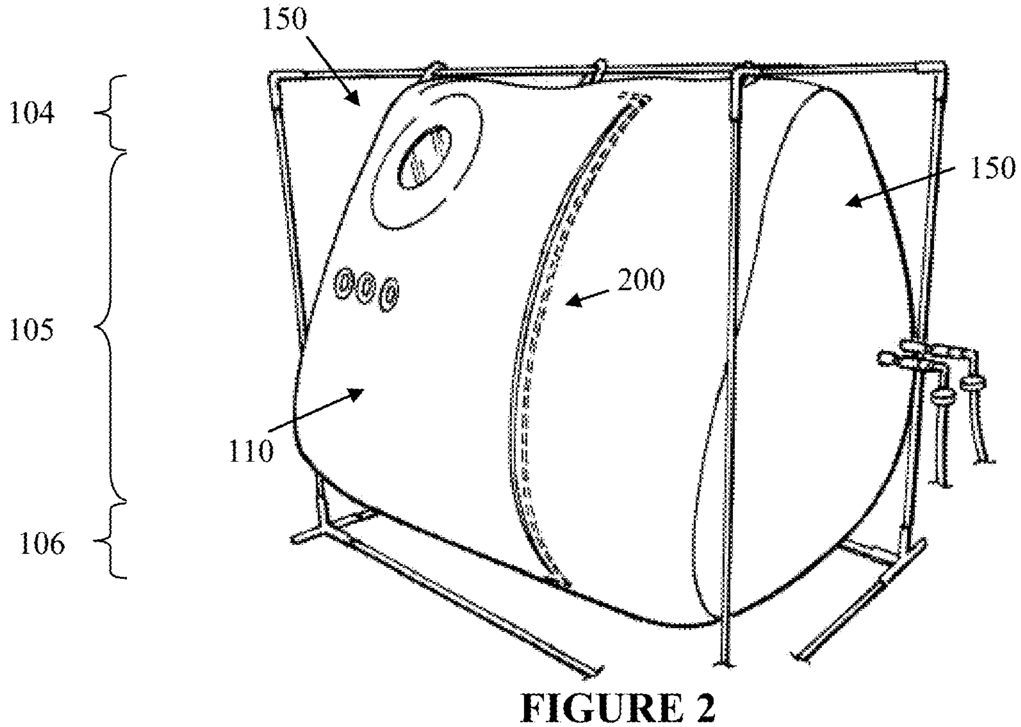
FIG. 2 is a perspective front view of a pressurized hyperbaric chamber having a closure member with an airtight seal.

Turning to the drawings, FIGS. 1, 2 show a portable pressurized hyperbaric chamber system 10 in accordance with one example embodiment of the disclosure. The system includes a portable pressurized hyperbaric chamber 100 having a seal assembly 200, a frame 50, and pressurizing equipment 75. The chamber 100 has an unpressurized operating state (FIGS. 1, 6(*a*), 7(*a*), also referred to here as a deflated state) and a pressurized operating state (FIGS. 2, 6(*b*), 7(*b*), also referred to here as an inflated state). The frame 50 supports the chamber 100 in both the unpressurized (FIGS. 1, 6(*a*), 7(*a*)) and pressurized (FIGS. 2, 6(*b*), 7(*b*)) operating states. And the pressurizing equipment 75 pressurize the chamber 100 to move from the unpressurized operating state to the pressurized operating state.

As described more fully below, the seal assembly 200 is attached to the chamber wall 110 (FIGS. 6-7), to create a pocket 290 therebetween. The chamber wall 110 has a first chamber wall access opening 130 that is opened and closed by a first chamber wall closure member 175 (e.g., first zipper). The sealing assembly 200 has a second seal panel access opening 230 that is opened and closed by a second seal panel closure member 275 (e.g., second zipper). The sealing assembly 200 also includes a sealing flap member 300 that is located in the pocket between the chamber wall 110. The sealing flap member 300 is made of a flexible material (e.g., neoprene or rubber) that, when the chamber 10 is pressurized (FIG. 6(*b*)), is pressed against and between the first chamber wall access opening 130 and the second sealing panel access opening 230 to form an airtight seal at the first chamber wall access opening 130 and the second sealing panel access opening 230 to improve the airtight seal at the closure members 175, 275.

Hyperbaric Chamber 100

The hyperbaric chamber 100 has a body 102 that is elongated and includes a medial main section 110 and two lateral sections 150 along a longitudinal axis direction (side to side in the embodiment shown). The main section 110 has a body wall 112 that is a thin sheet and defines an interior body wall surface 114 that faces the interior 101 of the chamber 100, and an exterior body wall surface 116 that faces the exterior of the chamber 100. Thus, the interior body wall surface 114 faces opposite the exterior body wall surface 116. The body 102 also has a top chamber portion 104, an intermediate chamber portion 105 and a bottom chamber portion 106, along a transverse axis direction (up/down in the embodiment shown).

The chamber 100 forms a complete enclosure having an interior space 101. In the embodiment shown, the chamber 100 has a triangular cross-section shape, though any suitable shape can be provided. Various objects, such as chair, table, medical devices, can be positioned inside the interior space 101 of the chamber.

The medial section 110 includes a first chamber body access opening 130 that permits entry into and exit from the interior space 101 of the chamber, and a seal assembly 200 that seals the access opening 130. As shown, the chamber body access opening 130 is formed by a slit or slot that has a first (left) chamber body opening side edge 132, a second (right) chamber body opening side edge 133, a top chamber body opening edge or point 134, and a bottom chamber body opening edge or point 135. The chamber body access opening 130 extends substantially the entire height of the chamber 100 from the top chamber portion 104 to the bottom chamber portion 106 of the chamber 100.

The access opening 130 is linear and is formed substantially vertically (i.e., transverse to the longitudinal axis) in the medial main section 110. As shown, the opening 130 extends to the floor of the chamber 100 so that the user need not step too high to enter and exit the interior space 101, without tripping.

Figure 4:
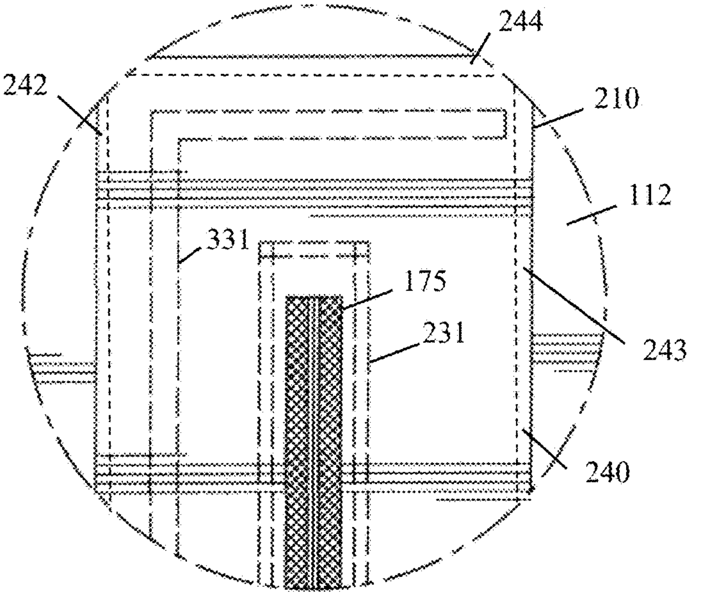
FIG. 4 is an enlarged view of a section of the seal assembly of FIG. 4.

As best shown in FIGS. 1, 4, a chamber body coupling section 140 extends completely around the access opening 130 at the exterior body surface 116 of the chamber body wall 112. In the embodiment shown, the chamber body coupling section 140 can form an elongated rectangle that is spaced apart from the left, right, top, and bottom chamber body opening edges 132-135. The chamber coupling section 140 has a chamber body left coupling section 142 that extends at a distance from the left body opening edge 132; a body right coupling section 143 that extends at a distance from the right body opening edge 133; a body top coupling section 144 that extends at a distance from the top body opening edge 134; and a body bottom coupling section 145 that extends at a distance from the bottom body opening edge 135. The top and bottom body coupling sections 144, 145 can be the same or different sizes and distances from the respective top and bottom opening edges 134, 135; and the left and right body coupling sections 142, 143 can be the same or different sizes and distances from the respective left and right opening edges 134, 135.

The first chamber wall closure member 175 is located in the chamber wall 112 about the chamber wall access opening 130 to open and close the entire opening 130. For example, the first closure member 130 has a tape (e.g., fabric or polyester), a slider, and two pull tabs. A chamber tape fastener 131 fastens the tape to the chamber wall 112, such as by sewing the tape to the chamber wall 112. As shown, the fastener 131 extends the entire length of the access opening 130, and is inset a distance from the side edges 132, 133 of the access opening 130, and from the top 134 and bottom 134 of the access opening 130.

The slider of the closure 175 has a first slider side with a first pull tab facing inwardly toward the chamber interior 101 and a second slider side with a second pull tab facing outwardly away from the chamber interior 101. Thus, the user can pull upward/downward on the first pull tab to open/close the first closure member 175 from inside the chamber interior 101, or the second pull tab to open/close the first closure member 175 from outside the chamber interior 101.

The chamber wall access opening 130 and chamber wall closure mechanism 175 are vertical, so that it is easy to open and close the closure mechanism 275. When pressurized (FIGS. 2, 6(*a*)), the chamber bulges or bows outward at the floor and sides. The frame 50 is fastened to the chamber 100 to stabilize the chamber. In one embodiment, the chamber 100 can be operated at a maximum operating pressure up to about 1.3 ATA, as provided by the FDA.

Entry Seal Assembly 200

Referring initially to FIGS. 1-2, the chamber 100 includes a replaceable entry seal assembly 200 that is positioned about the access opening 130 to seal the access opening 130, yet allow the access opening 130 to be opened and closed to selectively provide for entry and exit of persons and objects into and from the chamber interior 101.

As best shown in FIGS. 3-8, the seal assembly 200 includes a discrete protective outer seal panel 210 and a discrete replaceable inner sealing panel or flap member 300. The outer seal panel 210 includes a second seal opening/closure mechanism 275 (also referred to as a seal panel closure member). The outer seal panel 210 is an elongated (e.g., rectangular as shown in the example embodiments) thin sheet and can be made of the same material as the chamber wall 112. The outer seal panel 210 defines an interior panel surface 214 that faces the interior 101 of the chamber 100, and an exterior panel surface 216 that faces the exterior of the chamber 100. Thus, the interior panel surface 214 faces opposite the exterior panel surface 216. In the embodiment shown, the outer seal panel 210 is coupled to the interior body surface 114 of the chamber body 102, and the entire seal assembly 200 is located within the interior 101 of the chamber body 102. That is, both the outer protective seal panel 210 and the inner sealing flap member 300 are located within the chamber body wall 112.

Figure 3:
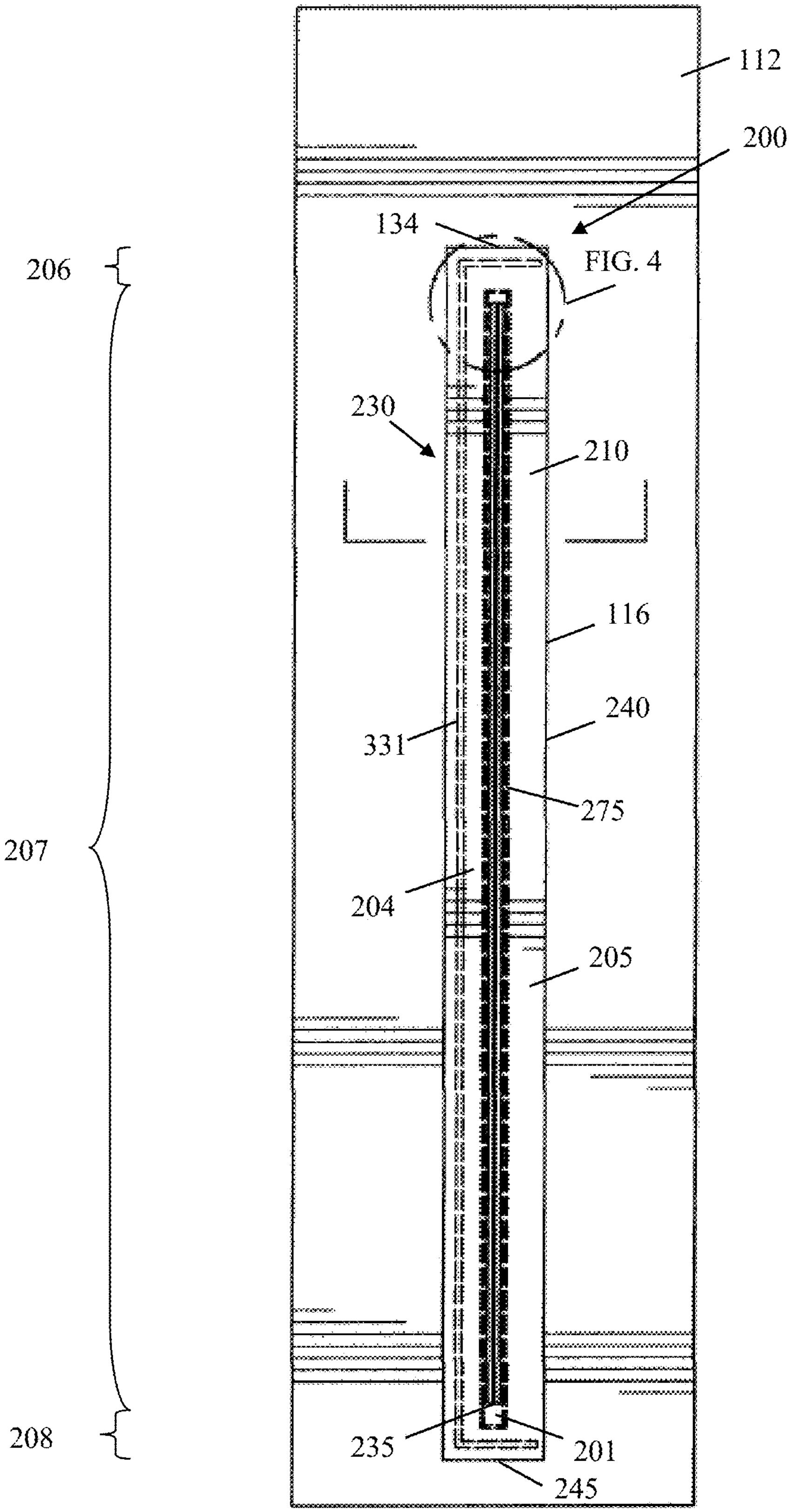
FIG. 3 is a plan view of an airtight seal assembly having a closure member.
Figures 6A, 6B:
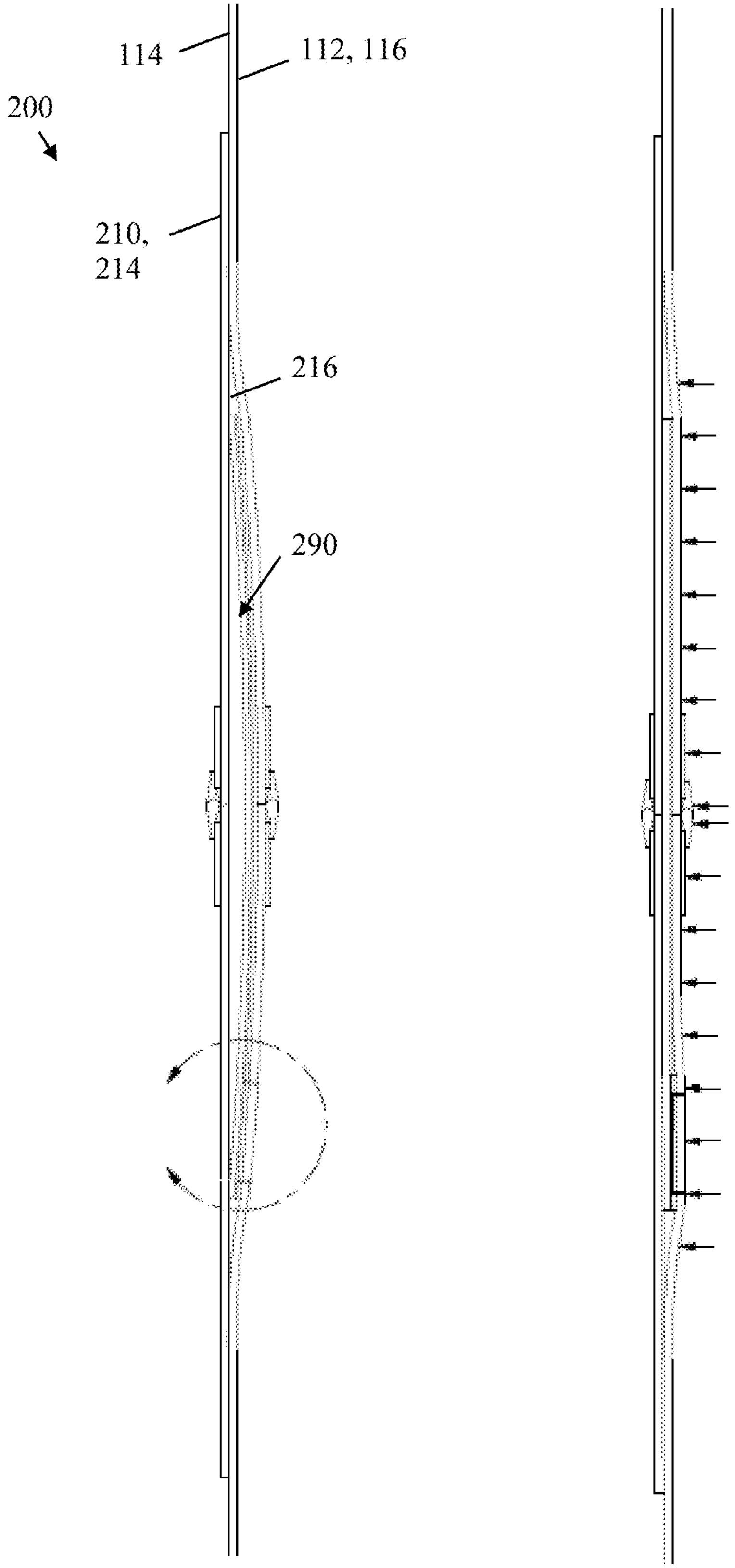
FIG. 6(*a*) is a side view of the seal assembly attached to an inner surface of the chamber wall when the chamber is not pressurized.
Figure 6C:
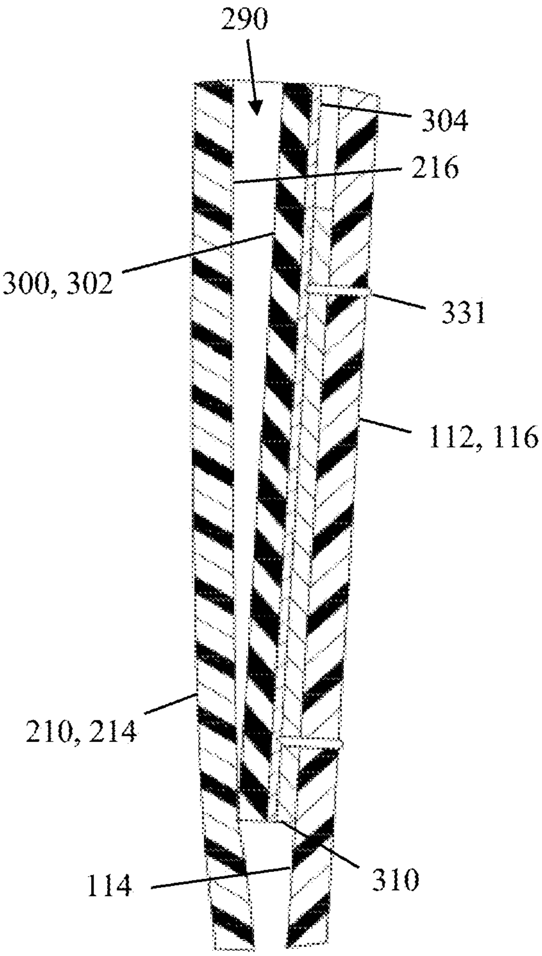
Figure 7A:
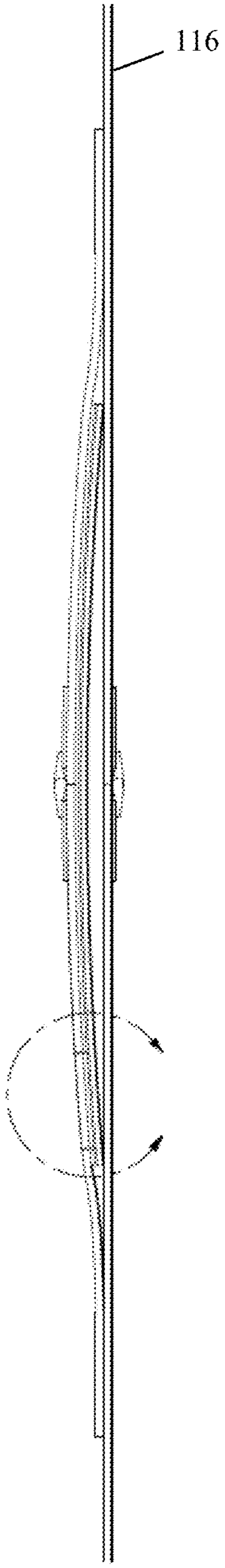
FIG. 7(*a*) is a side view of another illustrative example of the seal assembly attached to an outer surface of the chamber wall when the chamber is not pressurized.
Figure 7B:
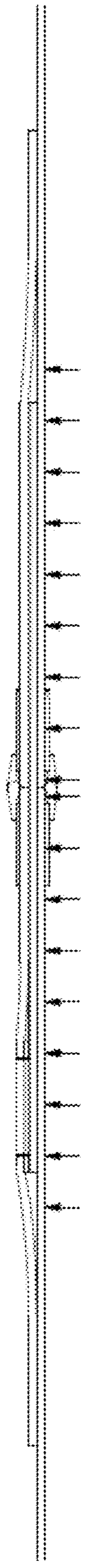
Figure 7C:
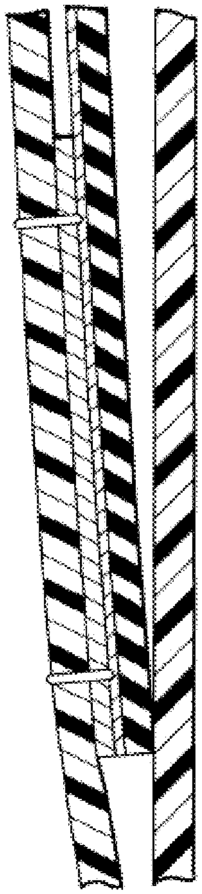

As best shown in FIGS. 3, 6, 7, the outer seal panel 210 has a top seal panel portion 206, a bottom seal panel portion 208, and an intermediate longitudinal seal panel portion 207 therebetween. In addition, referring to FIG. 3, the seal panel 210 has a left seal panel portion 204, a right seal panel portion 205, and an intermediate lateral seal panel portion 201 therebetween. A seal access opening or slot 230 extends along a longitudinal axis of the seal panel 210 the entire length of the intermediate seal panel portion 207, at the lateral intermediate portion 201 centered between the top seal panel portion 206 and the bottom seal panel portion 208, and centered between the left seal panel portion 204 and the right seal panel portion 205. The top and bottom seal panel portions 206, 208 can be the same size or different sizes; and the left and right seal panel portions 204, 205 can be the same sizes or different sizes.

As shown, the seal access opening 230 has a first (left) seal opening side edge 232, a second (right) seal opening side edge 233, a top seal opening edge or point 234, and a bottom seal opening edge or point 235. In the embodiment shown, the seal slot 230 is at the middle of the seal panel 210 longitudinally and transversely, at the intermediate longitudinal seal panel portion 207 and the intermediate lateral seal panel portion 201.

A seal coupling section 240 extends about the outer perimeter of the seal panel 210, at a portion of the lateral intermediate, left, right, top, longitudinal intermediate, bottom, seal panel portions 201, 204-208. Referring to FIGS. 3, 6(*a*)-(*c*), the entirety of the seal coupling section 240 at the exterior panel surface 216, couples with the entirety of the interior body surface 114 at the chamber coupling section 240 of the chamber body side wall 112. For example, an adhesive can be applied at the seal coupling section 240 and/or the chamber coupling section 140. In addition, the seal coupling section 240 and/or the chamber coupling section 140 can be roughened, such as by sanding, and then an adhesive applied to the seal coupling section 240 and/or the chamber coupling section 140. The seal coupling section 240 can then be pressed to the chamber coupling section 240 and the adhesion left to cure, in accordance with known techniques, to provide an airtight seal between the chamber wall 112 and the panel 210.

As best shown in FIGS. 1, 4, a panel body coupling section 240 extends completely around the access opening 230 at the exterior panel surface 216 of the panel 210. In the embodiment shown, the panel body coupling section 240 can form an elongated rectangle that is spaced apart inwardly from the left, right, top, and bottom chamber panel opening edges 232-235. The panel coupling section 240 has a panel left coupling section 242 that extends at a distance from the left panel opening edge 232; a panel right coupling section 243 that extends at a distance from the right panel opening edge 233; a panel top coupling section 244 that extends at a distance from the top panel opening edge 234; and a panel bottom coupling section 245 that extends at a distance from the bottom panel opening edge 235. The top and bottom body coupling sections 244, 245 can be the same or different sizes and distances from the respective top and bottom opening edges 234, 235; and the left and right body coupling sections 242, 243 can be the same or different sizes and distances from the respective left and right opening edges 234, 235.

Thus, the exterior seal panel surface 216 directly contacts the interior body wall surface 114, and is coupled thereto such as by an adhesive or the like. In other embodiments, such as shown for example in FIGS. 7(*a*)-(*c*), the seal assembly 200 can be located at the exterior body wall surface 114 of the body wall 112, though in such an embodiment the seal panel 210 can be pushed away from the body wall 122 when the chamber 100 is pressurized.

Figure 5:
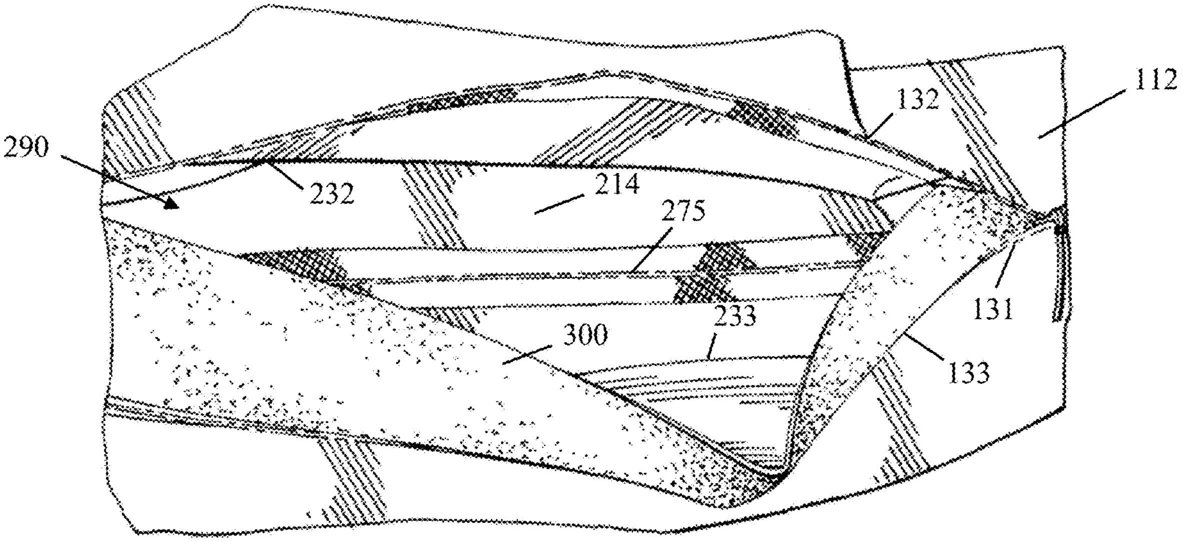
FIG. 5 shows the closure member in an open position.

As best shown in FIGS. 5-6, a pocket 290 is formed between the chamber wall 112 and the seal panel 210. In particular, the pocket 290 is located between the chamber wall inside surface 114 and the panel outer surface 216, and between the seal coupling section 240 and the chamber coupling section 140. The seal coupling section 240 and chamber coupling section 140 surround the entire chamber wall access opening 130, the entire chamber wall fastener 131, and the entire chamber wall closure member 175. Accordingly, the seal panel 210 encloses the entire chamber wall access opening 130, the entire chamber wall fastener 131, and the entire chamber wall closure member 175. And, the entire chamber wall access opening 130, the entire chamber wall closure member 175, and the entire chamber wall fastener 131, are all located in the pocket 290. In certain implementations, as shown, the pocket 290 has a same shape as the seal panel 210, here rectangular.

Referring to FIG. 3, the second seal panel closure member 275 is located in the seal panel 210 to open and close the seal panel access opening 230. The second panel closure member 275 is located about the panel wall access opening 230 to open and close the entire opening 230. For example, the second closure member 230 has a tape (e.g., fabric or polyester), a slider, and two pull tabs. A seal tape fastener 231 fastens the tape to the seal panel 210, such as by sewing the tape to the seal panel 210. As shown, the fastener 231 extends the entire length of the access opening 230, and is inset a distance from the side edges of the access opening 230, and from the top 234 and bottom 235 of the access opening 230.

In the implementation shown, the opening 230 and closure mechanism 275 are linear and vertical, so that it is easy to open and close the closure mechanism 275. The seal panel access opening 230 and the seal panel closure member 275 are aligned with the chamber wall access opening 130 and the chamber wall closure member 175, respectively. Accordingly, a user can pass directly through the chamber wall access opening 130 and the seal panel access opening 230 to enter and exit the chamber interior 101. In certain implementations the seal panel closure member 275 is the same length as the chamber wall closure member 175, as shown.

Seal Flap Member 300

Referring to FIGS. 1, 5, 6(*c*), a replaceable seal flap member 300 is coupled with the chamber body wall 112 and located in the pocket 290, between the chamber wall 112 and the seal panel 210. The seal flap member 300 is made of a compressible material, such as neoprene or rubber, to simultaneously seal the chamber wall access opening 130, the chamber wall closure member 175, the seal panel access opening 230, and the seal panel closure member 275.

The seal flap member 300 is a thin elongated discrete sheet or wall that has a same shape as the seal panel 210, here rectangular. The seal flap member 300 is smaller than the seal panel 210, so that the seal flap member 300 can be fully received in the pocket 290, and sandwiched between the seal panel 210 and the chamber wall 112. The seal flap member 300 has a flap inner surface 302, a flap outer surface 304, a flap top end portion, flap bottom end portion, and a flap intermediate portion between the flap top end portion and the flap bottom end portion. The flap member 300 extends from the seal panel top portion 206 to the seal panel bottom portion 208.

In the implementation of FIGS. 6(*a*)-6(*c*), the seal flap inner surface 302 faces and contacts the panel outer surface 216, and the seal flap 300 extends and covers the entire length of the panel access opening 240, the panel closure member 275 and the panel closure tape fastener 231. The seal flap outer surface 304 faces and contacts the chamber body inner wall surface 114 and chamber closure tape fastener 131, and the seal flap 300 extends and covers the entire length of the chamber wall access opening 130, the chamber wall closure member 175 and the chamber closure tape fastener 131. The seal flap 300 need not extend the entire length and width of the pocket 290, but has a width that is sufficient to extend to cover the access openings 130, 230, closure members 175, 275, and tape fasteners 131, 231.

Referring to FIG. 6(*c*), a fastening member 310 removably couples the seal flap 300 with the chamber wall 112. Accordingly, the seal flap 300 can be removed and replaced, as needed. Here, the fastening member 310 is an elongated hook fastener strip 310, and flap fasteners 331 couple the fastener strip 310 to the chamber wall 112, such as by sewing the hook strip 310 to the chamber wall 112. The strip 310 has a smooth side that faces and contacts the chamber wall inner surface 114, and a hook side that faces and couples with the flap outer surface 304. The outer surface 304 of the flap 300 can be a fabric that has a loop (i.e., a hook-sensitive) structure that sticks or couples to the hook fastener strip 310. Thus, the flap 300 can be formed of two layers, namely a neoprene or rubber layer that forms the inner surface 302 of the flap 300, and a fabric layer that forms the outer surface 304 of the flap 300. The fabric layer can be coupled to the neoprene or rubber layer by an adhesive or other fastening feature. Thus, the outer fabric layer 304 of the flap 300 removably couples with the hook fastener 310, which is affixed to the chamber wall 112, such that the flap 300 is removably attached to the chamber wall 112.

Turning to FIGS. 3, 4, the flap fastener 331 extends vertically at one side of the pocket 290 and one side of the chamber access opening 130 to be parallel to the access opening 130 and the chamber closure 175. This allows the opposite longitudinal side of the flap 300 to be free, so that the user can pass by the free side of the flap 300 without interference by the flap 300. The flap fastener 331 also extends the full length of the access openings 130, 230 to maintain the flap 300 inside the pocket 290 in a proper position with respect to said pocket 290, chamber wall 112, chamber access opening 130 and chamber closure 175, without getting folded over or falling out of position or otherwise inadvertently not covering the access openings 130, 230, the closures 175, 275, or the seams 131, 231. The transverse top and bottom of the flap fastener 331 also retain the flap 300 in the proper position within the pocket 290 to extend the width of the pocket 290. The flap fastener 331 also retains the flap 300 within the proper position within the pocket 290 after the user has passed by, without the flap 300 coming free.

Optionally, the top and/or bottom of the flap fastener 331 can also extend orthogonally inward toward the access opening 130 and the chamber closure 175, above and below at a distance from the top 134 and bottom 135 of the access opening 130, respectively. It is further noted that the flap fastener 331 is formed in the chamber wall 112, and is inside the chamber coupling section 140, so that the seal panel 210 encloses and seals the flap fastener 331. In addition, the seal flap 300 extends over the flap fastener 331 to further seal the flap fastener 331.

It is noted that other suitable fastening members 310 can be utilized to attach the hook fastener 310 to the chamber wall 112, such as an adhesive. And in certain implementations, the hook fastener 310 can be coupled with the panel 210 instead of the chamber wall 112. Still further, in certain implementations, the seal flap 300 can be loose inside the pocket 290, and completely unattached including unattached from the chamber wall 112 and the seal panel 210. It is further noted that the seal flap 300 is a separate piece that is separate from the chamber wall 112 and separate from the panel 210. However, in other embodiments of the disclosure, the seal flap 300 can be integral with the chamber wall 112 or the panel 210, for example the panel 210 can have a neoprene or rubber layer formed at the outer surface of the panel 210, such as by a spray coating or an adhesive that couples the neoprene or rubber layer to the panel 210. Still further, the flap 300 can be coupled to the chamber wall 112 or panel 210 other than by using hook and look features, such as by providing a resealable seal, such as a press-seal (Ziploc-type) feature.

The opening/closure mechanism 275 is shown extending to the extreme top of the chamber, and the chamber 100 can be sized so that it can be used for a seated person and can be shorter than a standing person so that the opening/closure mechanism can be reached and easier to operate to the extreme top of the chamber. In other embodiments, however, the opening/closure mechanism 275 need not extend to the extreme top of the chamber 100.

As shown, the chamber wall 112 and the panel 210 only require a single closure mechanism 175, 275, respectively, to provide a total of two closure mechanisms 175, 275. Thus, no more than two closure mechanisms are required. In other implementations, each of the closure mechanisms 175, 275 can include a fastener such as one or more sliding zippers, for example one or more coil safety zippers and/or an off-center airtight main zipper, such as those shown in U.S. Pat. No. 12,156,835, which is hereby incorporated by reference in its entirety. The airtight zipper is sandwiched off-center between two coil safety zippers for maximum strength. The airtight zipper has very limited separation strength, so it is reinforced to isolate it from stress when pressurized. Two large coil fasteners are provided, one on either side of the airtight zipper for stress isolation. That is, a first coil fastener is provide at the inside of the chamber to open/close a first inner door layer, and a second coil fastener is provided at the outside of the chamber to open/close a second outer door layer. The airtight zipper opens/closes a main door layer, which is located between the first and second layers. To close the opening, the user can close the fasteners in sequence, such as the first coil fastener, then the main fastener, then the second coil fastener; or, the second coil fastener, then the main fastener, then the first coil fastener. The coil fasteners reduce the pressure/stress on the main airtight zipper to make it easier to open and close the airtight zipper and so the coil fasteners support and reinforce the airtight zipper. The fasteners can be operated from inside and/or outside the chamber.

Operation

The access openings 130, 230 are only intended to be opened when the chamber 10 is not pressurized, or only slightly pressurized, but can be opened when the chamber 10 is fully or partly pressurized.

To gain entry into the chamber interior 101, or prevent access into the chamber interior 101, the user must open/close both the first chamber wall closure member 175 and the second seal panel closure member 275. If a single person is operating the closure members 175, 275, the closure members 175, 275 must be operated in sequence. For example, if a user is entering from the outside, a user must open the first chamber wall closure member 175, push the sealing flap member 300 to the side, and then open the second seal panel closure member 275. The user can then pass through the first chamber wall access opening 130 and the second sealing panel access opening 230, into the chamber interior 101. The first chamber wall closure member 175 and the second seal panel closure member 275 each have two tabs or handles, so that the closure members 175, 275 can be opened and closed from either the inside of the chamber interior 101 or outside of the chamber 10, as needed. Of course, if two persons are operating the closure members 175, 275, the closure members 175, 275 can be operated simultaneously.

When pressurized, the chamber 10 bulges or bows outward at the floor and sides. The frame 50 is fastened to the chamber 100 to stabilize the chamber. In one embodiment, the chamber 100 can be operated at a maximum operating pressure up to about 1.3 ATA, as provided by the FDA.

In addition, when the chamber 100 is pressurized, the seal panel 210 is pressed closer to the chamber wall 112, as best shown by comparing FIG. 6(*a*) (unpressurized) with FIG. 6(*b*) (pressurized). The seal panel outer wall surface 216 presses against the seal flap inner wall surface 302, to further seal the chamber wall 112, the panel access opening 230, and the panel closure member 275. And, the seal flap outer wall surface 304 presses against the chamber inner wall surface 114 to further seal the chamber access opening 130, the chamber closure member 175, the fastener strip 310, and the fastener 331.

The chamber closure 175 and the chamber fastener seams 131 are not always completely airtight, and can wear and degrade over time. Accordingly, the panel 210 provides an airtight seal about the chamber closure 175 and fastener seam 131 to further facilitate an airtight chamber wall 112. When the chamber is pressurized, the seal flap 300 presses against the closure 175 and seam 131 to provide an airtight seal at the closure 175 and seam 131. In addition, the panel provides an airtight seal about the panel closure 275 and fastener seam 231 to further facilitate an airtight chamber 10. When the chamber is pressurized, the seal flap 300 presses against the closure 275 and seam 231 to provide an airtight seal at the closure 275 and seam 231.

The opening/closure mechanism 275 is shown extending to the extreme top of the chamber, and the chamber 100 can be sized so that it can be used for a seated person and can be shorter than a standing person so that the opening/closure mechanism can be reached and easier to operate to the extreme top of the chamber. In other embodiments, however, the opening/closure mechanism 275 need not extend to the extreme top of the chamber 100.

As noted, the panel 210 and seal flap 300 are described to provide an airtight seal at a closure 175 located in a chamber wall 112. However, the panel 210 and seal flap 300 can be utilized for other applications where an airtight barrier is needed. In addition, the panel 210 is applied to a flexible chamber wall 112 made of cloth or plastic material of an inflatable hyperbaric chamber 10. However, the panel 210 can be applied to other materials, such as rigid plastic or metal.

The closure mechanisms 175, 275 can include a fastener such as one or more sliding zippers, for example one or more coil safety zippers and/or an off-center airtight main zipper, such as those shown in U.S. Pat. No. 12,156,835, which is hereby incorporated by reference in its entirety. The airtight zipper is sandwiched off-center between two coil safety zippers for maximum strength. The airtight zipper has very limited separation strength, so it is reinforced to isolate it from stress when pressurized. Two large coil fasteners are provided, one on either side of the airtight zipper for stress isolation. That is, a first coil fastener is provide at the inside of the chamber to open/close a first inner door layer, and a second coil fastener is provided at the outside of the chamber to open/close a second outer door layer. The airtight zipper opens/closes a main door layer, which is located between the first and second layers. To close the opening, the user can close the fasteners in sequence, such as the first coil fastener, then the main fastener, then the second coil fastener; or, the second coil fastener, then the main fastener, then the first coil fastener. The coil fasteners reduce the pressure/stress on the main airtight zipper to make it easier to open and close the airtight zipper and so the coil fasteners support and reinforce the airtight zipper. The fasteners can be operated from inside and/or outside the chamber.

It is further noted that the drawings may illustrate and the description and claims may use several geometric or relational terms and directional or positioning terms, such as between, linear, elongated, parallel, perpendicular, orthogonal, transverse, vertical, horizontal, top, bottom, left, right, up, down, inner, outer, side, interior, and exterior. Those terms are merely for convenience to facilitate the description based on the embodiments shown in the figures, and are not intended to limit the disclosure. Thus, it should be recognized that the disclosure can be described in other ways without those geometric, relational, directional or positioning terms. In addition, the geometric or relational terms may not be exact. For instance, walls or surfaces may not be exactly flat, perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the disclosure.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. An inflatable chamber comprising:
- a chamber wall, and a chamber access opening formed in said chamber wall;
- a chamber closure formed in said chamber wall at said chamber access opening, said chamber closure opening and closing to permit and deny entry through said chamber access opening;
- a panel having a panel outer perimeter, said panel directly coupled with said chamber wall at a panel coupling point at the panel outer perimeter to form an airtight seal between said chamber wall and said panel at the panel outer perimeter, and forming a pocket between said chamber wall and said panel;
- a panel access opening formed in said panel;
- a panel closure formed in said panel at said panel access opening, said panel closure opening and closing to permit and deny entry through said panel access opening;
- a seal flap located in said pocket between said chamber wall and said panel, wherein said seal flap provides an airtight seal that seals said chamber closure; and
- a fastening feature inside said pocket and at least partly coupling said seal flap directly to said chamber wall at a fastening coupling point located inward of the panel coupling point.

2. The chamber of claim 1, wherein said chamber closure is sewn to said chamber wall to form a seam, and said seal flap provides an airtight seal that seals said seam.

3. The chamber of claim 1, said fastening feature comprising a fastening strip sewn to said chamber wall and having a strip surface that removably couples with said seal flap to retain said seal flap in position within said pocket.

4. The chamber of claim 3, wherein said strip surface comprises a hook feature, and said seal flap has a loop feature that removably engages with said hook feature.

5. The chamber of claim 1, said seal flap having one side coupled to said chamber wall by said fastening feature, and an opposite unattached side.

6. The chamber of claim 1, said chamber wall having an inner surface and an outer surface, said panel sealed with the inner surface of said chamber wall to provide the airtight seal.

7. The chamber of claim 1, wherein a user can pass through said chamber access and said panel access when said chamber closure and said panel closure are open, and wherein a user cannot pass through said chamber access and said panel access when said chamber closure and said panel closure are closed.

8. The chamber of claim 1, wherein when the chamber is pressurized, said seal flap is pressed toward said chamber wall to further seal said chamber closure.

9. The chamber of claim 1, wherein when the chamber is pressurized, said seal flap is pressed toward said chamber wall to further seal said panel closure.

10. The chamber of claim 1, wherein said chamber wall is flexible.

11. The chamber of claim 1, wherein said chamber wall is non-rigid.

12. The chamber of claim 1, wherein said chamber is a hyperbaric chamber.

13. The chamber of claim 1, wherein said pocket fully encloses said seal flap and fully surrounds the entirety of said chamber closure.

14. The chamber of claim 1, wherein said chamber closure has an elongated closure side and a closure top, and said fastening feature extends along the elongated closure side and above the closure top.

15. An inflatable chamber comprising:

a chamber wall with a chamber zipper formed therein;

a panel having a panel zipper formed therein and a panel perimeter, said panel perimeter sealed directly to said chamber wall about said chamber zipper in an airtight manner to form a pocket between said chamber wall and said panel;

a seal flap positioned in said pocket to provide an airtight seal at said chamber zipper; and a fastening feature inside said pocket and at least partly coupling said seal flap directly to said chamber wall.

16. The chamber of claim 15, wherein said chamber zipper is sewn to said chamber wall to form a seam, and said seal flap provides an airtight seal that seals said seam.

17. The chamber of claim 15, said fastening feature comprising a fastening strip sewn to said chamber wall and having a strip surface that removably couples with said seal flap to retain said seal flap in position within said pocket.

18. The chamber of claim 17, wherein said strip surface comprises a hook feature, and said seal flap has a loop feature that removably engages with said hook feature.

19. The chamber of claim 15, wherein said chamber zipper has an elongated zipper side and a zipper top, and said fastening feature extends along the elongated zipper side and above the zipper top.

* * * * *